United States Patent [19]
Clamme

[11] Patent Number: 5,973,422
[45] Date of Patent: Oct. 26, 1999

[54] LOW FREQUENCY VIBRATOR

[75] Inventor: Marvin L. Clamme, New Knoxville, Ohio

[73] Assignee: The Guitammer Company, Columbus, Ohio

[21] Appl. No.: 09/121,880

[22] Filed: Jul. 24, 1998

[51] Int. Cl.[6] .................................................. H02K 33/00
[52] U.S. Cl. ............................ 310/36; 310/15; 310/90.5; 381/150
[58] Field of Search ................................... 310/36, 30, 15, 310/27, 17, 90.5; 381/150, 152, 395

[56] References Cited

U.S. PATENT DOCUMENTS

| | | | |
|---|---|---|---|
| 2,167,078 | 7/1939 | Lakatos | 333/186 |
| 3,024,374 | 3/1962 | Stauder | 310/15 |
| 3,105,153 | 9/1963 | James, Jr. | 290/1 R |
| 3,178,512 | 4/1965 | Ashworth | 381/120 |
| 3,582,875 | 6/1971 | Wambeck et al. | 367/182 |
| 3,846,225 | 11/1974 | Armstrong et al. | 340/3 R |
| 3,891,874 | 6/1975 | Roters et al. | 310/14 |
| 3,976,339 | 8/1976 | Sabnis | 310/90.5 |
| 4,038,634 | 7/1977 | Caliri | 340/459 |
| 4,090,745 | 5/1978 | Dohogne et al. | 310/90.5 |
| 4,363,980 | 12/1982 | Petersen | 310/15 |
| 4,542,311 | 9/1985 | Newman et al. | 310/15 |
| 4,675,907 | 6/1987 | Itagaki et al. | 600/446 |
| 4,785,816 | 11/1988 | Dow et al. | 318/481 |
| 4,788,968 | 12/1988 | Rudashevsky et al. | 381/186 |
| 4,914,750 | 4/1990 | Lawson | 60/78 |
| 5,111,697 | 5/1992 | Habermann et al. | 73/668 |
| 5,187,398 | 2/1993 | Stuart et al. | 310/14 |
| 5,220,223 | 6/1993 | Mehnert | 310/14 |
| 5,231,336 | 7/1993 | Namen | 318/128 |
| 5,335,284 | 8/1994 | Lemons | 381/152 |
| 5,424,592 | 6/1995 | Bluen et al. | 310/28 |

Primary Examiner—Thomas M. Dougherty
Assistant Examiner—Joseph Waks
Attorney, Agent, or Firm—Frank H. Foster; Kremblas, Foster, Millard & Pollick

[57] ABSTRACT

A low frequency vibrator has a stator member with a cylindrical, central chamber, a cylindrical, tubular liner of low friction, non-ferromagnetic material positioned in the chamber to form a bearing and a cylindrical, ferromagnetic, reciprocating piston slidably mounted in the liner. The stator has a pair of coils and a permanent magnet is positioned centrally in the reciprocating piston. A ferromagnetic flux conductor surrounds the coils and extends between opposite ends of the chamber. This structure creates a magnetic spring, having a spring constant K. The ratio of K to the mass M of the reciprocating member is made substantially equal to the square of a radian frequency in the operating frequency range of the vibrator.

39 Claims, 4 Drawing Sheets

LOW FREQUENCY VIBRATOR

BACKGROUND OF THE INVENTION

1. Field Of The Invention

This invention relates generally to electromagnetic transducers for converting electrical signals to mechanical vibrations, and more particularly relates to a vibrator for operating at very low frequencies and applying sufficient power to a sounding board structure for enhancing the simulated realism of attending a live, musical or other audible event.

2. Description Of The Related Art

The experience of live music and other audible events includes not only the sensation of sound as sensed by human ears, but additionally includes the sensation of low frequency vibrations through portions or all of the human body. Consequently, reproduction of a faithful simulation of an audible experience includes not only reproduction of the sound through conventional sound transducers, such as speakers, but additionally includes reproduction of the low frequency vibrations by imparting such vibrations to a sounding board structure, such as a floor or wall of a room, or to articles, such as furniture within the room, so the sensation of physical motion at low frequencies may be perceived by the listeners.

Digital audio and high fidelity film and video monitor soundtracks are capable of recording these low frequency signals. However, modern bass speaker systems are expensive if they are capable of reproducing those sub-bass and sub-audio frequencies which are generated in live performances, movie sound tracks, and events. Practical bass speaker systems are designed to faithfully reproduce sound within an operating range of frequencies, but this range does not extend sufficiently low to also reproduce those frequencies which are the subject of this invention.

Prior art workers have proposed designs for vibratory transducers capable of operating in a low frequency operating range. Vibrators proposed for these purposes include those shown in U.S. Pat. Nos. 5,424,592; 3,178,512; 4,914,750; 4,788,968; and 4,675,947. These prior designs, however, suffer from one or more disadvantageous characteristics. One problem is that they exhibit an insufficient frequency response at the very lowest frequencies in the range below 30 Hz. Another major problem arises because such devices include mechanical springs which are required to both resonate a reciprocating mass and to hold the reciprocating mass in place within the device.

For example, U.S. Pat. No. 5,424,592 utilizes planar springs. However, planar springs inherently have a limited range of translation because of their structure. Beyond their limited range, their spring constant K increases non-linearly. Consequently, they have a narrow range of permissible deflection and therefore permit insufficient maximum amplitudes of oscillation of the reciprocating mass to which they are attached.

Still other vibrators, such as that shown in U.S. Pat. No. 4,675,907, utilize an elastomeric material as a spring, but this too has a very narrow band of permissible translation. Although coil springs might be used, these would greatly increase the length of the vibrator along its axis of reciprocation. Furthermore, all mechanical springs suffer from fatigue and heating and resulting power loss when subjected to large amplitudes of oscillation.

Finally, the prior art vibrators which have previously been proposed tend to utilize relatively complicated structures which are therefore expensive to manufacture and expensive to assemble.

It is therefore an object of the present invention to provide a mechanical vibrator which utilizes very simple structures which are easily assembled and which do not require a mechanical spring, and yet provide a strong centering spring force by a spring structure which is not subject to fatigue.

It is a further object and feature of this invention to provide a vibrator structure which has a very low ratio of spring constant to reciprocating mass, and therefore can exhibit a large amplitude, low frequency response, while, at the same time, permitting large translations, a large spring constant and large mass. The larger these latter three parameters are, the more energy storage in the oscillating, mechanical system, and therefore the more force and power applied to an attached sounding board structure where the audio experience is being reproduced.

SUMMARY OF THE INVENTION

The vibrator of the present invention is particularly advantageous for reproducing mechanical vibrations from an electrical signal at sub base frequencies, but is also useful for other vibrator applications, such as in vibration canceling systems and when attached to a diaphragm as a motor to move air. The vibrator has a stator member having a cylindrical, central chamber and a cylindrical, ferromagnetic reciprocating piston member movably mounted in the central chamber. Preferably a cylindrical, tubular liner of non-ferromagnetic material provides a bearing which lines the chamber. A ferromagnetic flux conducting path is formed on the stator and extends from one end of the chamber to the opposite end. One of the members includes at least one coil connectable to the low frequency electrical signal, and the other member includes an axially polarized, permanent magnet, for forming a magnetic spring providing an axial centering force upon the reciprocating member. The spring constant of the magnetic spring and the mass of the reciprocating member have a ratio substantially equal to the square of a radian frequency in the operating frequency range of the vibrator.

Figure 1:
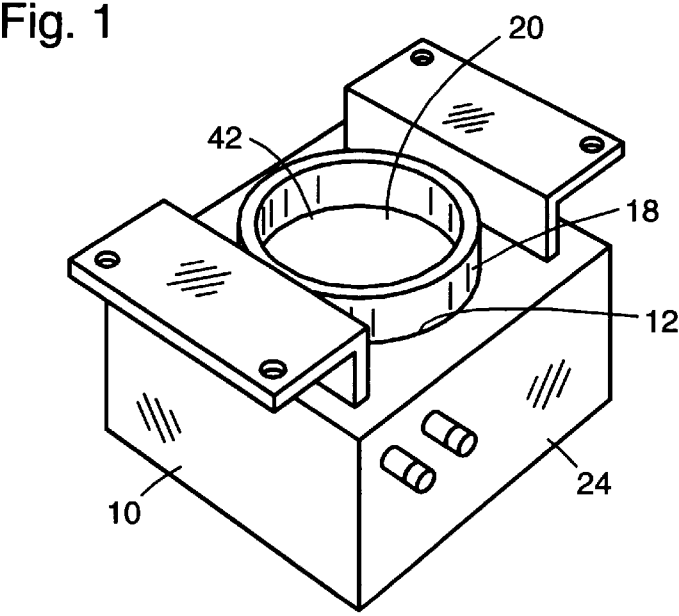
FIG. 1 is a view in perspective of the preferred embodiment of the invention.
Figure 2:
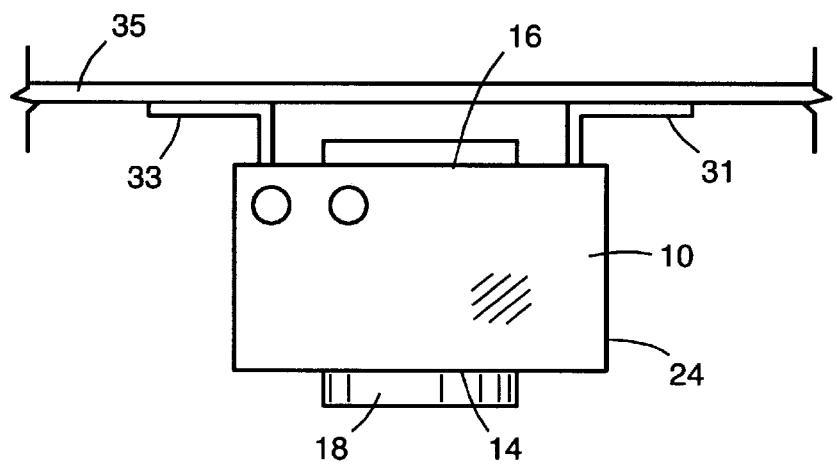
FIG. 2 is a side view of the embodiment of FIG. 1.
Figure 3:
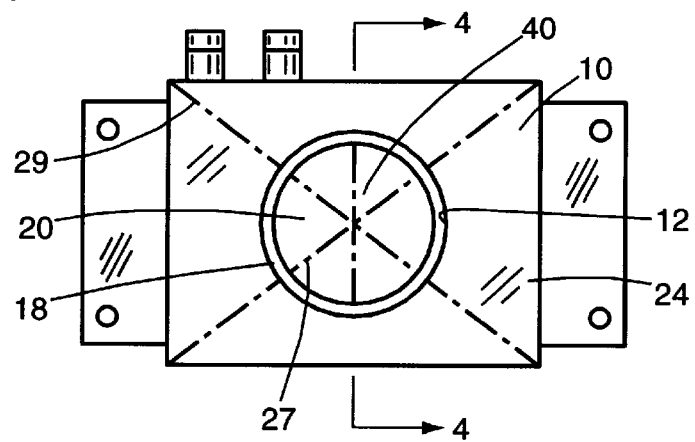
FIG. 3 is an end view of the embodiment of FIG. 1.
Figure 4:
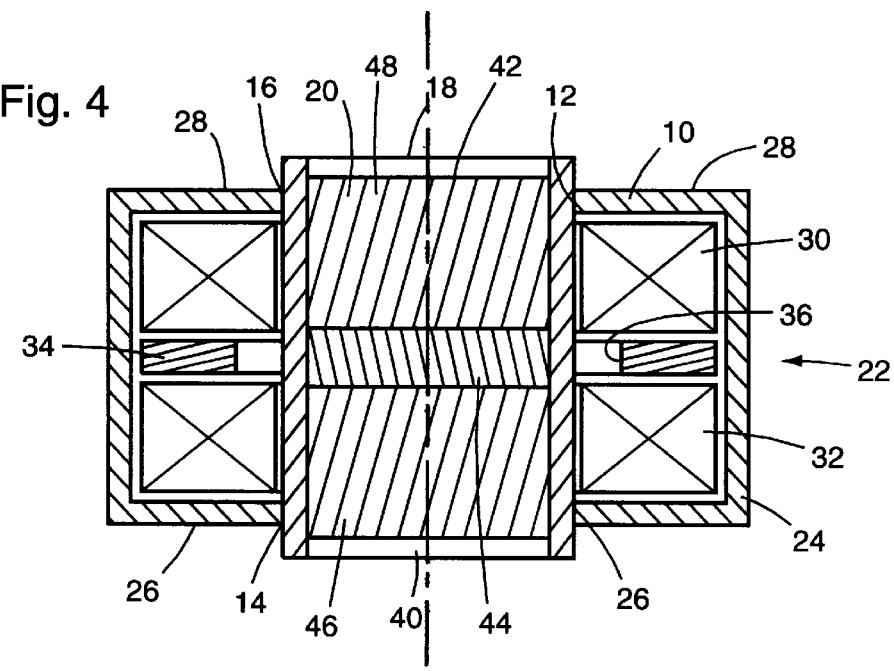
FIG. 4 is a view in axial section, taken substantially along the line 4—4 of FIG. 3.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DESCRIPTION OF THE PREFERRED EMBODIMENT

FIGS. 1–4 illustrate the preferred embodiment of the invention. The low frequency vibrator of FIGS. 1–4 has a stator member 10 which has a cylindrical, central chamber 12 extending along a central axis 13 between its opposite ends 14 and 16. A cylindrical, tubular liner 18 of non-ferromagnetic, material, such as molybdenum nylon composite bearing material, forms a bearing lining the interior of the central chamber 12. Preferably, this tubular bearing is open-ended and long enough to allow large amplitude oscillations and extends beyond the central chamber in order to radially confine a cylindrical, ferromagnetic reciprocating piston member 20 over a wider range of axial displacement during its oscillation. In the preferred embodiment, the liner 18 has an inside diameter of 2.1 inches, a length of 4 inches and a thickness of 0.2 inches, and the reciprocating piston member has a length of 3.5 inches.

The chamber 12 of the stator member 10 extends along a central axis in opposite directions from a magnetic center 22 of the stator member 10. The outer housing 24 of the stator member 10 is constructed of a ferromagnetic low reluctance material, such as steel, and therefore forms a ferromagnetic flux conductor including its opposite ferrous pole piece portions 26 and 28 to provide a low reluctance flux path extending from one end of the chamber to the opposite end of the chamber.

In order to reduce the generation of possible eddy currents in the ferromagnetic materials, slots extending radially from the central axis, such as slots 27 in the piston member 20 and slots 29 in the stator member 10, may be provided. The segments of these structures which are separated by the slots may be joined in the conventional manner, such as by means of an electrically insulating adhesive or small mechanical connectors. A pair of mounting feet 31 and 33 are welded to the stator member 10 and provided with suitable holes so that fasteners, such as screws, may be utilized to mount the entire unit to a sounding board structure 35, such as a floor, wall or article of furniture.

A spaced pair of coils 30 and 32 are mounted in the stator member 10 and are wound around the central chamber 12, each coil and its surrounding ferrous material forming an electromagnet for connection to the low frequency electrical signals. The electromagnets are wound or connected in a direction to generate axial magnetic fields from those electrical signals in opposite axial directions along the central chamber 12. The coils are positioned interiorly of the low reluctance flux conductor formed by the outer case 24.

An annular, central, pole piece 34 extends inwardly from the flux conductor 24 towards the chamber 12. The central pole piece 34 is positioned between the coils 30 and 32 and is preferably located at the magnetic center of the stator member 10. Preferably, the central pole piece 34 extends only part way to the cylindrical chamber 12 so that its inner boundary 36 is spaced from the chamber 12.

Figure 8:
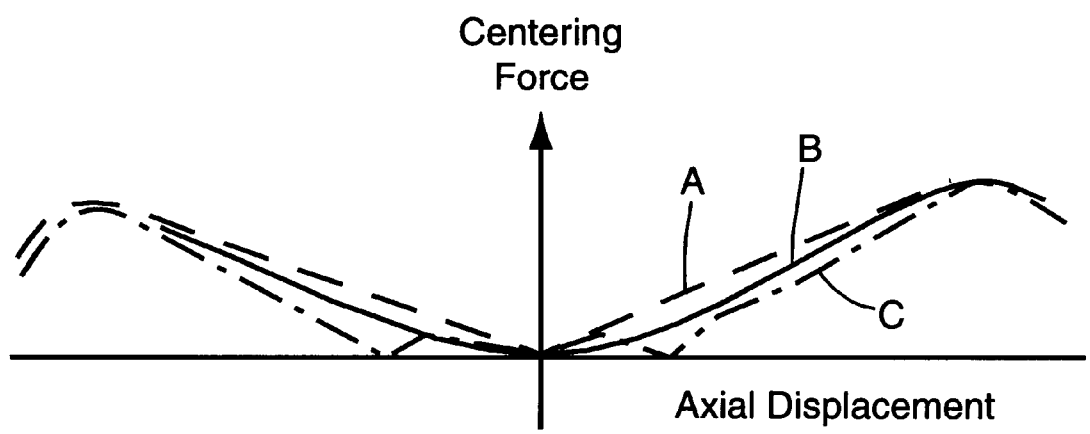
FIG. 8 is a graph illustrating centering forces.

The central pole piece 34 operates to broaden and flatten the central region of the plot of centering force as a function of displacement, as illustrated in FIG. 8. Dashed curve A represents the centering force in the absence of any central pole piece plotted as a function of displacement from the magnetic center of the stator member. Alternate dash-dot curve B represents the plot of the centering force if the central pole piece were to extend all the way to the bearing liner. In the latter event, there would be two equilibrium positions, one on each side of the center, as illustrated by curve B. By extending the central pole piece radially only part way inwardly from the outer housing 24, the centering force applied to the reciprocating body for small displacements, as shown by curve C, is reduced to form the central widened, flattened portion of curve C. As a result, the reciprocating body of the vibrator will have a larger displacement for small amplitude electrical signals. The designer may vary the radial dimension of the central pole piece to obtain a curve suitable for each particular application.

The opposite ends 40 and 42 of the reciprocating piston member 20 extend radially outwardly from the central axis, nearly to the ends of the ferromagnetic flux conductor 24 to minimize the length of the flux gap which is essentially equal to the thickness of the tubular bearing 18. Minimizing this gap maximizes the centering force applied to the reciprocating piston member 20. Preferably, the reciprocating piston member 20 is formed from a circular, axially polarized, permanent magnet 44 sandwiched between and bonded to a pair of ferromagnetic cylinders 46 and 48, such as steel cylinders mounted on axially opposite ends of the permanent magnet 44. In this way, a complete magnetic circuit loop is created through flux conducting outer housing 24 and the reciprocating piston member 20.

Because the coils 30 and 32 are wound in opposite directions or connected to provide oppositely directed magnetic fields, the forces which each electromagnet applies on the reciprocating member 20 are in the same direction and therefore are summed. These forces urge the reciprocating member toward the same extreme of its oscillatory motion. When the low frequency AC electrical signal shifts polarity, both forces drive the reciprocating member in the opposite direction so that the drive forces of both coils are always additive.

The magnetic spring centering the reciprocating member 20 results from the combination of the permanent magnetic 44 and the low reluctance flux path, including ferromagnetic cylinders 46 and 48, and the low reluctance flux conductor formed by the outer housing 24 which includes pole piece portions 26 and 28. The centering force results from the principle that the reciprocating member 20 is moved by the magnetic forces to the position of lowest reluctance. The design of the present invention has both simple structures and yet a strong centering force because the closed flux path has flux gaps only through the cylindrical bearing 18. This permits the magnetic spring to be the only spring, eliminating the necessity of a mechanical spring.

Consequently, the designer is able to choose a magnet strength, gap width, and a reciprocating member mass so that the spring constant K of the magnetic spring resonates the reciprocating member. More specifically, the reciprocating member is designed to have a mass M and the magnet is chosen to provide a spring constant K for providing a ratio of K to M which is substantially equal to the square of a radian frequency in the operating frequency range of the vibrator. In the preferred embodiment the natural frequency for mechanical resonance is about 8 Hz or 9 Hz. Although unnecessary, a mechanical spring having a small k, and therefore inconsequentially effecting the resonant frequency, could also be used. The preferred resonance characteristic is a low Q resonant peak characterized by a relatively flat and broad pass band. A typical Q for a preferred embodiment would be in or near the range of 0.7 to 0.9. The value of Q is a decreasing function of energy dissipation in the resonant system and the principal causes of energy dissipation are friction between the reciprocating member and the bearing and the IR losses in the coils and the ferromagnetic materials.

In the preferred embodiment, the reciprocating member has a mass providing a weight of 3½ pounds, and a magnet having a magnetic strength of 13 K gauss.

By providing a vibrator which can be designed for a resonant frequency relying entirely, or at least principally, upon the magnetic spring for resonance, the problems with stiff mechanical springs are avoided. Furthermore, larger forces may be applied, and therefore more power may be coupled, to a sounding board structure to which the vibrator is attached because of the increased energy storage capability of a vibrator embodying the invention. The energy storage is increased by allowing increased mass and spring constant, while maintaining the small spring constant to mass ratio, and by permitting increased maximum amplitudes of oscillation. Both the energy storage in the oscillating mechanical system and the force applied by it to the sounding board structure are increasing functions of K, M and amplitude of oscillation. By eliminating the constraints of mechanical springs, the structure is not only simplified, but the amplitude of oscillation is not constrained by the limitations of mechanical springs. Furthermore, and additionally, the elimination of the need for mechanical springs eliminates the need to assemble and align the reciprocating member.

A variety of alternative embodiments and modifications of the invention are possible. For example, the locations of the permanent magnet and the coils may be interchanged between the stator member and the reciprocating member. However, it is preferred that the coils be mounted on the stator member so there are no moving wires. Furthermore, embodiments can utilize one or more coils and/or more than one magnet. Preferably, however, the coils and magnets are symmetrically positioned about the magnetic centers of the respective stator members and reciprocating members. However, if an embodiment of the invention is mounted with its axis in a vertical orientation or having a component of vertical orientation, the positioning of the permanent magnet and electromagnet coils, as well as the length of the extension of the non-ferromagnetic bearing from the stator chamber, may be offset to accommodate the bias force of gravity.

Figure 5:
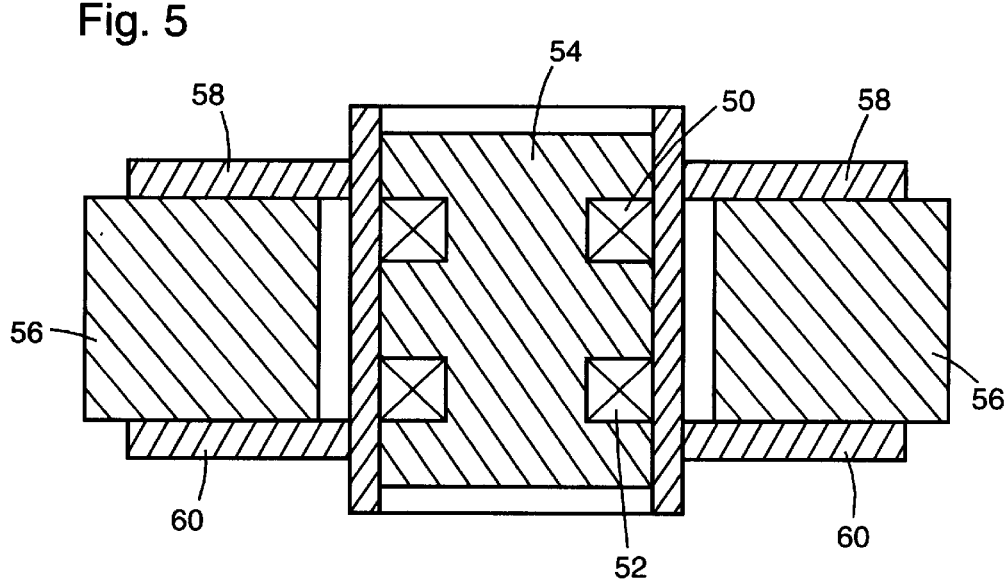
FIG. 5 is a view in axial section of an alternative embodiment of the invention.

FIG. 5 illustrates one alternative embodiment of the invention in which the reciprocating member has two annular coils 50 and 52 wound in annular slots in a reciprocating, ferrous cylindrical piston 54. The stator member is formed by an annular permanent magnet 56 positioned between a pair of annular, washer-shaped, pole pieces 58 and 60. In this embodiment, the flux conductor includes the permanent magnet 56, as well as the pole pieces 58 and 60.

Figure 6:
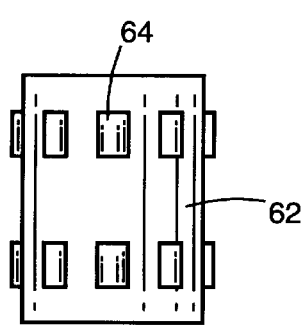
FIG. 6 is a side view of an alternative-reciprocating member of the invention.

FIG. 6 illustrates an alternative structure to provide a bearing for the reciprocating member. Reciprocating piston member 62 of FIG. 6 has a plurality of low friction pads 64, spaced around and bonded to the outer peripheral surface of the reciprocating member 62. These, for example, may be formed using Teflon or other very low friction materials. Roller bearings could be substituted for the Teflon pads.

Figure 7:
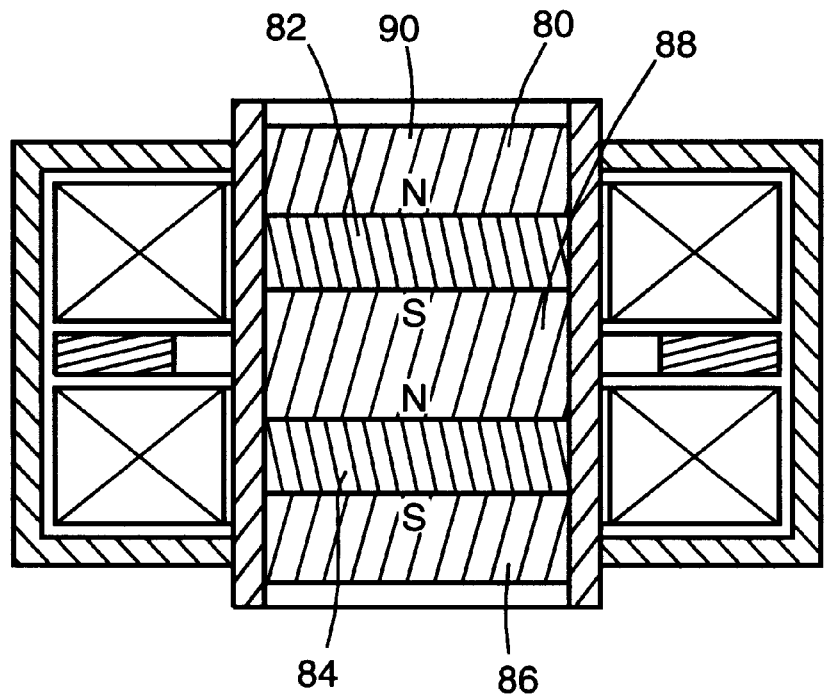
FIG. 7 is a view in axial section of yet another alternative embodiment of the invention.

FIG. 7 illustrates one manner in which multiple magnets may be stacked and symmetrically positioned about the central magnetic axis of a reciprocating member 80. The embodiment of FIG. 7 is similar to the embodiment of FIG. 4, except that the reciprocating member 80 has a pair of spaced permanent magnets 82 and 84 laminated between three cylindrical ferromagnetic segments 86, 88 and 90.

Figure 9:
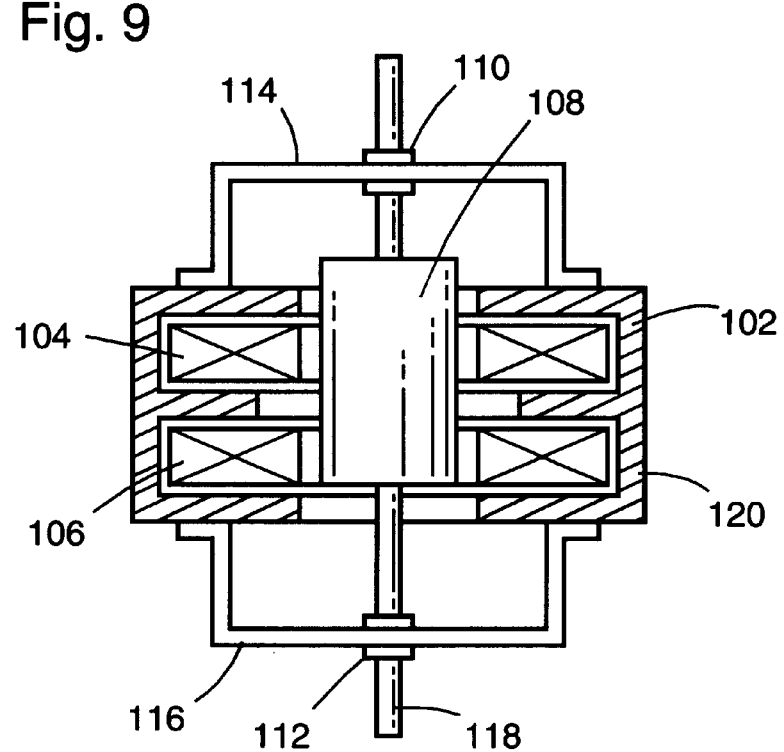
FIGS. 9 and 10 are axial views of alternative embodiments taken similarly to FIGS. 4 and 5.

FIG. 9 illustrates an alternative embodiment having an outer housing 102, coils 104 and 106, and reciprocating member 108, similar to those illustrated in the previous figure. However, instead of utilizing a tubular bearing, the embodiment of FIG. 9 has bearings 110 and 112 supported on cross beams 114 and 116, which are fastened to opposite ends of the outer housing 102. An axial shaft 118 extends from opposite ends of the reciprocating member 108 and slides within the bearings 110 and 112. This structure maintains the radial alignment of the reciprocating member 108 as it oscillates within the stator member 120. Consequently, although the tubular bearing previously illustrated is preferred, it is not the only manner of maintaining the radial alignment of the reciprocating member. The reciprocating member 108 is illustrated off center in order to more completely reveal the structures. One potentially undesirable feature of this embodiment for some applications is that the bearing structure may divide less friction than in the previously described embodiments, and consequently a higher Q resonant system.

Figure 10:
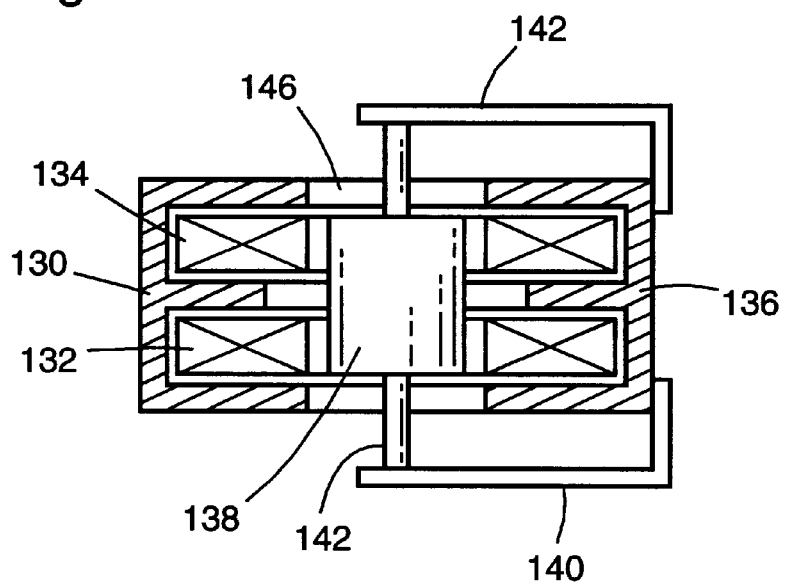

FIG. 10 illustrates yet another alternative embodiment, having an outer housing 130 and coils 132 and 134 in the stator member 136, and also having a reciprocating member 138, all similar to foregoing embodiments. However, the reciprocating member 138 is maintained in radial alignment by a pair of flexible cantilevered beams 140 and 142, each of which is fixed at one end to the outer housing 130 and at its other end at the ends of a shaft 142, which is in turn fixed to the reciprocating member 138. Consequently, FIG. 10 also illustrates yet another alternative manner of mounting the reciprocating member. Although the cantilever beams 140 and 142 may have some resilience and therefore have a spring constant associated with that resilience, the value of that spring constant is preferably relatively small or inconsequential with respect to the magnetic spring constant. The cantilever beams 140 and 142 are preferably made as long as possible to minimize radial motion as the reciprocating member 138 reciprocates within the central chamber 146.

The vibrator of the present invention may be utilized for driving other loads. To facilitate the connection of the piston to a load, a threaded or tapped bore may be provided, preferably axially into the end of the piston member. One example of an alternative load is a diaphragm which is driven in oscillation perpendicular to the plane of the diaphragm, in order to generate vibrations in the air in the form of alternate compressions and rarefactions in the nature of sound at the operating frequency of the vibrator. Conveniently, an axially threaded bore in the piston may be connected by mechanical linkage to the center of such a diaphragm and the stator member mounted to a mechanical support for the diaphragm.

End caps may also be mounted to the axially opposite ends of the stator member 10. They should not extend directly across the opposite ends of the tubular liner 18, but rather must have walls spaced outwardly from those ends. For example, the end caps might be domed-shaped and spaced sufficiently far from the ends of the tubular liner 18 (FIGS. 1–3), so that they do not interfere with the normal excursions of the piston member 20. Such end caps not only protect the sliding surfaces within the vibrator from the collection of dust, but additionally prevent the launching of the piston out of the tubular liner 18 as a result of large amplitude, electrical transients applied to the coils.

A designer may vary the mass of the piston member 20 in order to vary the resonant frequency of the vibrator and tailor it to a particular load. A particularly advantageous manner of varying the mass of the piston member 20 is to form the piston member with hollow portions. This would permit a single stator member to be utilized with a variety of different reciprocating piston members designed for differing loads, for which differing resonant frequencies are appropriate.

As a further enhancement, heat radiation fins may be formed on the stator member to minimize operating temperature by enhancing conduction of heat from the vibrator. Such fins would be formed and operate in the conventional manner.

Of course, a variety of other modifications and alternatives may be applied to the principles of the present invention. While certain preferred embodiments of the present invention have been disclosed in detail, it is to be understood that various modifications may be adopted without departing from the spirit of the invention or scope of the following claims.

I claim:

1. A vibrator for converting electrical signals to mechanical vibrations and comprising:

a stator member having a central chamber extending along a central axis between opposite ends, and a cylindrical ferromagnetic reciprocating member axially, movably mounted in the chamber, the stator member also having a ferromagnetic flux conductor including at least pole piece portions adjacent opposite ends of the chamber and providing a low reluctance flux path extending from one of the ends of the chamber to an opposite one of the ends of the chamber, said stator member including a coil connectable to an electrical signal and the reciprocating member including an axially polarized permanent magnet for forming a magnetic spring providing an axially centering force upon the reciprocating member, wherein the reciprocating member has a mass m and the magnetic spring has a spring constant k and wherein a ratio k/m is substantially equal to a square of a radian frequency in an operating frequency range of the vibrator.

2. A vibrator in accordance with claim 1 and further comprising a tubular liner of non-ferromagnetic material extending axially through the chamber and forming a bearing.

3. A vibrator in accordance with claim 2 wherein the bearing extends axially outwardly beyond the pole piece portions.

4. A vibrator in accordance with claim 1 wherein the permanent magnet is circular and is sandwiched between a pair of ferromagnetic cylinders mounted to axially opposite ends of the permanent magnet.

5. A vibrator for converting electrical signals to mechanical vibrations and comprising:

a stator member having a central chamber extending along a central axis in opposite directions from a magnetic center to opposite ends and a ferromagnetic reciprocating member movably mounted in the chamber and having said magnetic center, the stator member also having a ferromagnetic flux conductor including at least pole piece portions adjacent opposite ends of the chamber and providing a low reluctance flux path extending from one end of the chamber to an opposite end of the chamber, said reciprocating member having a pair of axially polarized magnets symmetrically spaced on opposite sides of the magnetic center and the stator member having an axially polarized magnet positioned symmetrically with respect to the magnetic center, said magnet of said stator member being an electromagnet formed by a coil connectable to electrical signals and each of said magnets of the reciprocating member being a permanent magnet for providing a magnetic spring having a spring constant k and applying a centering force upon the reciprocating member, the spring constant k of the magnetic spring and a mass m of the reciprocating member having a ratio k/m substantially equal to a square of a radian frequency in an operating frequency range of the vibrator.

6. A vibrator in accordance with claim 5 wherein the stator member magnate comprises a spaced pair of coils connected to generate axial magnetic fields from the electrical signals in opposite directions along the chamber and wherein the flux conductor extends exteriorly of the coils.

7. A vibrator in accordance with claim 6 wherein a central pole piece is positioned between the coils and extends inwardly from the flux conductor toward the chamber at the magnetic center of the stator member for reducing a magnetic centering force exerted upon the reciprocating member for small displacements.

8. A vibrator in accordance with claim 7 where a central pole piece inner boundary is spaced from the chamber.

9. A vibrator in accordance with claim 5 wherein at least opposite ends of the ferromagnetic reciprocating member extend radially outwardly from the central axis nearly to the ends of the ferromagnetic flux conductor to form a flux gap.

10. A vibrator in accordance with claim 5 wherein a non-ferromagnetic, cylindrical tube forming a bearing is interposed in the chamber between the stator member and the reciprocating member.

11. A vibrator in accordance with claim 10 wherein the bearing extends axially beyond the ends of the chamber.

12. A vibrator in accordance with claim 5 wherein the magnets of the reciprocating member are each a circular permanent magnet and the reciprocating member further comprises a pair of ferromagnetic cylinders mounted to axially opposite sides of the permanent magnet and having a substantially same exterior diameter as the permanent magnet.

13. A vibrator in accordance with claim 5 wherein the stator member magnet comprises a spaced pair of coils connected to generate axial magnetic fields in opposite directions along the chamber and wherein the permanent magnets are located substantially symmetrically of the magnetic center of the reciprocating member.

14. A vibrator in accordance with claim 13 wherein the flux conductor extends exteriorly of the coils.

15. A vibrator in accordance with claim 14 wherein a central pole piece is positioned between the coils and extends inwardly from the flux conductor toward the chamber substantially at the magnetic center of the stator member for reducing the centering force exerted upon the reciprocating member for small displacements.

16. A vibrator in accordance with claim 15 where a central pole piece inner boundary is spaced from the chamber.

17. A vibrator in accordance with claim 16 wherein at least opposite ends of the ferromagnetic reciprocating member extend radially outwardly from the central axis nearly to the ends of the ferromagnetic flux conductor to form a flux gap.

18. A vibrator in accordance with claim 17 wherein said chamber is cylindrical, wherein the magnets of the reciprocating member are circular permanent magnets and the reciprocating member further comprises a pair of ferromagnetic cylinders mounted to axially opposite sides of the permanent magnet and having a same exterior diameter as the permanent magnet.

19. A vibrator in accordance with claim 18 wherein a non-ferromagnetic, cylindrical tube forming a bearing is interposed in the chamber between the stator member and the reciprocating member.

20. A vibrator in accordance with claim 19 wherein the bearing extends axially beyond the ends of the chamber.

21. A vibrator for converting electrical signals to mechanical vibrations and comprising:

a stator member having a central chamber extending along a central axis between opposite ends, and a cylindrical ferromagnetic reciprocating member axially, movably mounted in the chamber, the stator member also having a ferromagnetic flux conductor including at least pole piece portions adjacent opposite ends of the chamber and providing a low reluctance flux path extending from one of the ends of the chamber to an opposite one of the ends of the chamber, said reciprocating member including a coil connectable to an electrical signal and the stator member including an axially polarized permanent magnet for forming a magnetic spring providing an axially centering force upon the reciprocating member, wherein the reciprocating member has a mass m and the magnetic spring has a spring constant k and wherein a ratio k/m is substantially equal to the square of a radian frequency in an operating frequency range of the vibrator.

22. A vibrator in accordance with claim 21 and further comprising a tubular liner of non-ferromagnetic material extending axially through the chamber and forming a bearing.

23. A vibrator in accordance with claim 22 wherein the bearing extends axially outwardly beyond the pole piece portions.

24. A vibrator in accordance with claim 21 wherein the permanent magnet is circular and is sandwiched between a pair of ferromagnetic cylinders mounted to axially opposite ends of the permanent magnet.

25. A vibrator for converting electrical signals to mechanical vibrations and comprising:

a stator member having a central chamber extending along a central axis in opposite directions from a magnetic center to opposite ends and a ferromagnetic reciprocating member movably mounted in the chamber and having said magnetic center, the stator member also having a ferromagnetic flux conductor including at least pole piece portions adjacent opposite ends of the chamber and providing a low reluctance flux path extending from one end of the chamber to an opposite end of the chamber, said stator member having a pair of axially polarized magnets symmetrically spaced on opposite sides of the magnetic center and the reciprocating member having an axially polarized magnet positioned symmetrically with respect to the magnetic center, said magnet of said reciprocating member being an electromagnet formed by a coil connectable to electrical signals and each of said magnets of the stator member being a permanent magnet for providing a magnetic spring having a spring constant k and applying a centering force upon the reciprocating member, the spring constant k of the magnetic spring and a mass m of the reciprocating member having a ratio k/m substantially equal to a square of a radian frequency in an operating frequency range of the vibrator.

26. A vibrator in accordance with claim 25 wherein the reciprocating member magnet comprises a spaced pair of coils connected to generate axial magnetic fields from the electrical signals in opposite directions along the chamber and wherein the flux conductor extends exteriorly of the coils.

27. A vibrator in accordance with claim 26 wherein a central pole piece is positioned between the coils and extends inwardly from the flux conductor toward the chamber at the magnetic center of the stator member for reducing a magnetic centering force exerted upon the reciprocating member for small displacements.

28. A vibrator in accordance with claim 27 where a central pole piece inner boundary is spaced from the chamber.

29. A vibrator in accordance with claim 25 wherein at least opposite ends of the ferromagnetic reciprocating member extend radially outwardly from a central axis nearly to ends of the ferromagnetic flux conductor to form a flux gap.

30. A vibrator in accordance with claim 25 wherein a non-ferromagnetic, cylindrical tube forming a bearing is interposed in the chamber between the stator member and the reciprocating member.

31. A vibrator in accordance with claim 30 wherein the bearing extends axially beyond the ends of the chamber.

32. A vibrator in accordance with claim 25 wherein each magnet of the stator member is a circular permanent magnet and the reciprocating member further comprises a pair of ferromagnetic cylinders mounted to axially opposite sides of the permanent magnet and having substantially a same exterior diameter as the permanent magnet.

33. A vibrator in accordance with claim 25 wherein the reciprocating member magnets comprise a spaced pair of coils connected to generate axial magnetic fields in opposite directions along the chamber.

34. A vibrator in accordance with claim 33 wherein the flux conductor extends exteriorly of the coils.

35. A vibrator in accordance with claim 34 wherein a central pole piece is positioned between the coils and extends inwardly from the flux conductor toward the chamber substantially at the magnetic center of the stator member for reducing a magnetic centering force exerted upon the reciprocating member for small displacements.

36. A vibrator in accordance with claim 35 where a central pole piece inner boundary is spaced from the chamber.

37. A vibrator in accordance with claim 36 wherein at least opposite ends of the ferromagnetic reciprocating member extend radially outwardly from the central axis nearly to the ends of the ferromagnetic flux conductor to form a flux gap.

38. A vibrator in accordance with claim 37 wherein a non-ferromagnetic, cylindrical tube forming a bearing is interposed in the chamber between the stator member and the reciprocating member.

39. A vibrator in accordance with claim 38 wherein the bearing extends axially beyond the ends of the chamber.

* * * * *